Figure 1:
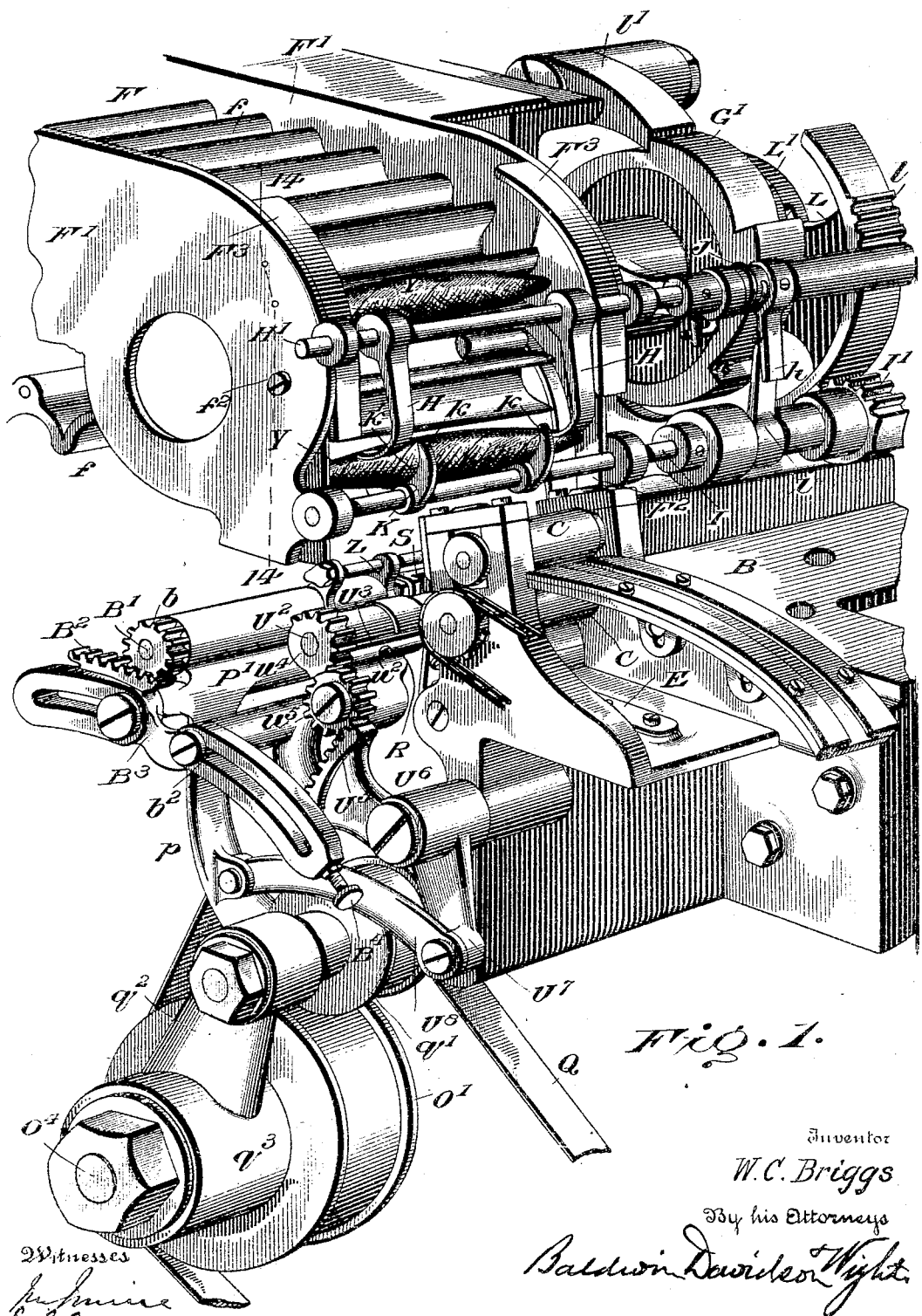

No. 764,707. PATENTED JULY 12, 1904.
W. C. BRIGGS.
MACHINE FOR APPLYING BANDS OR LABELS TO CIGARS OR OTHER ARTICLES.
APPLICATION FILED FEB. 17, 1904.
NO MODEL. 10 SHEETS—SHEET 1.

Inventor
W. C. Briggs
By his Attorneys
Baldwin Davidson Wight

Witnesses

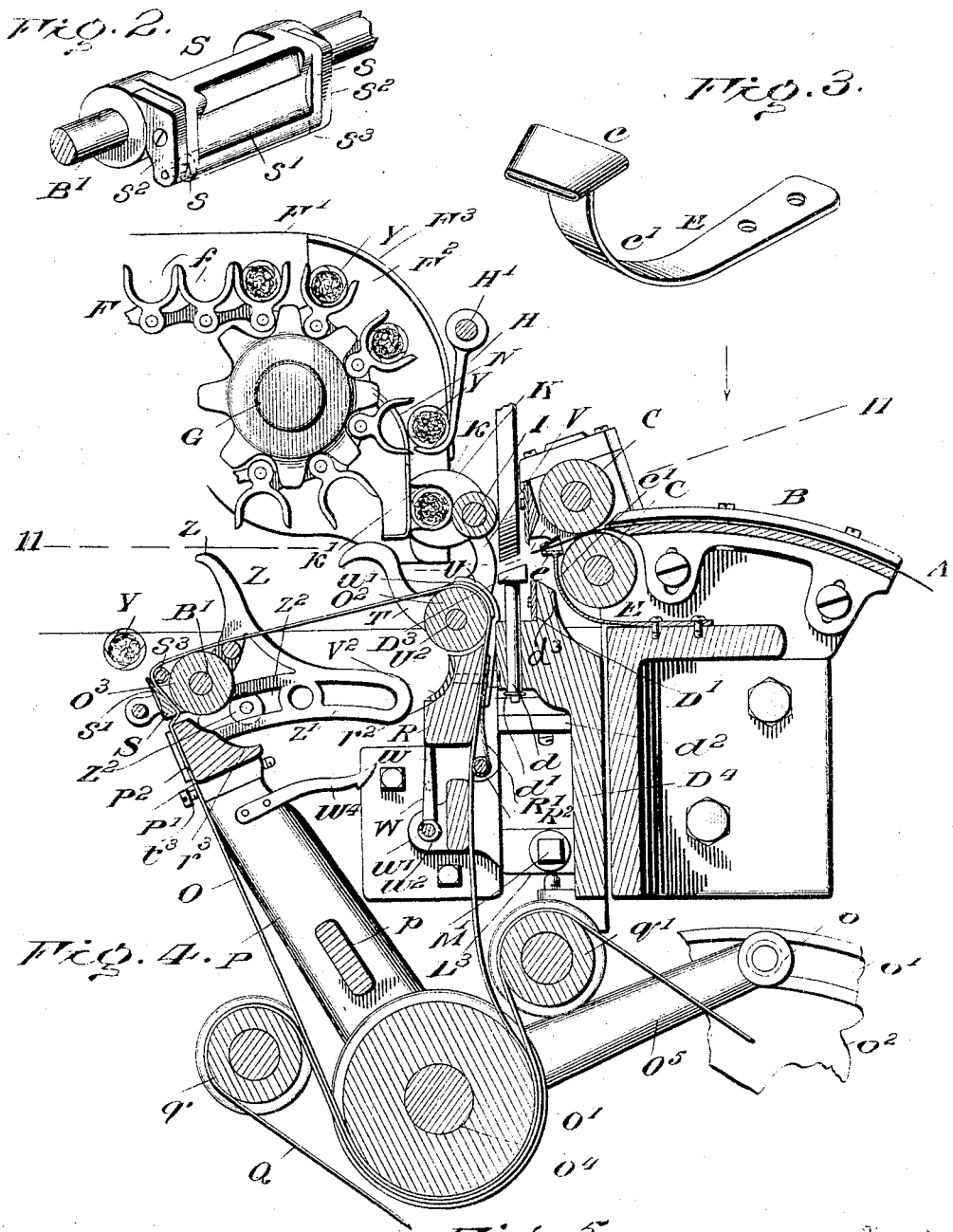

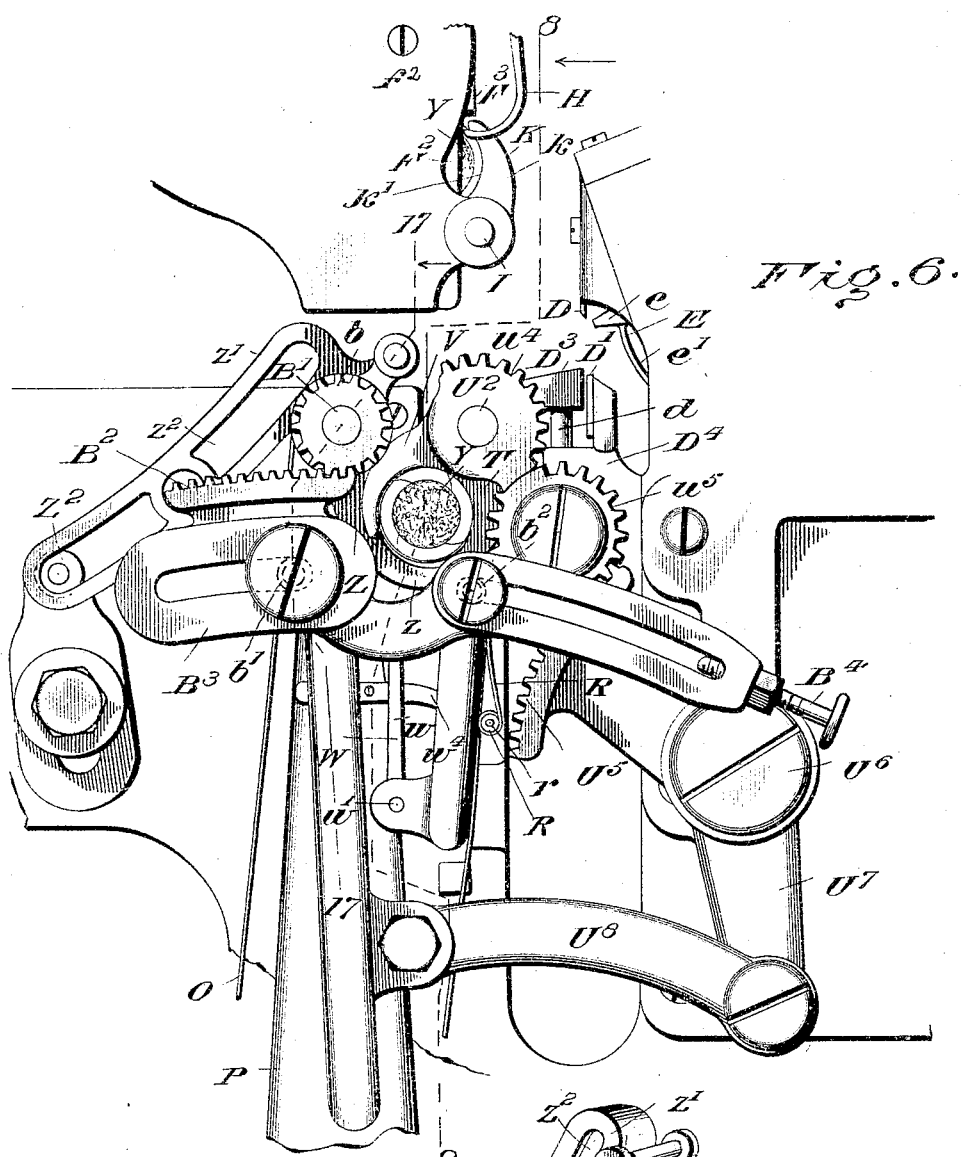

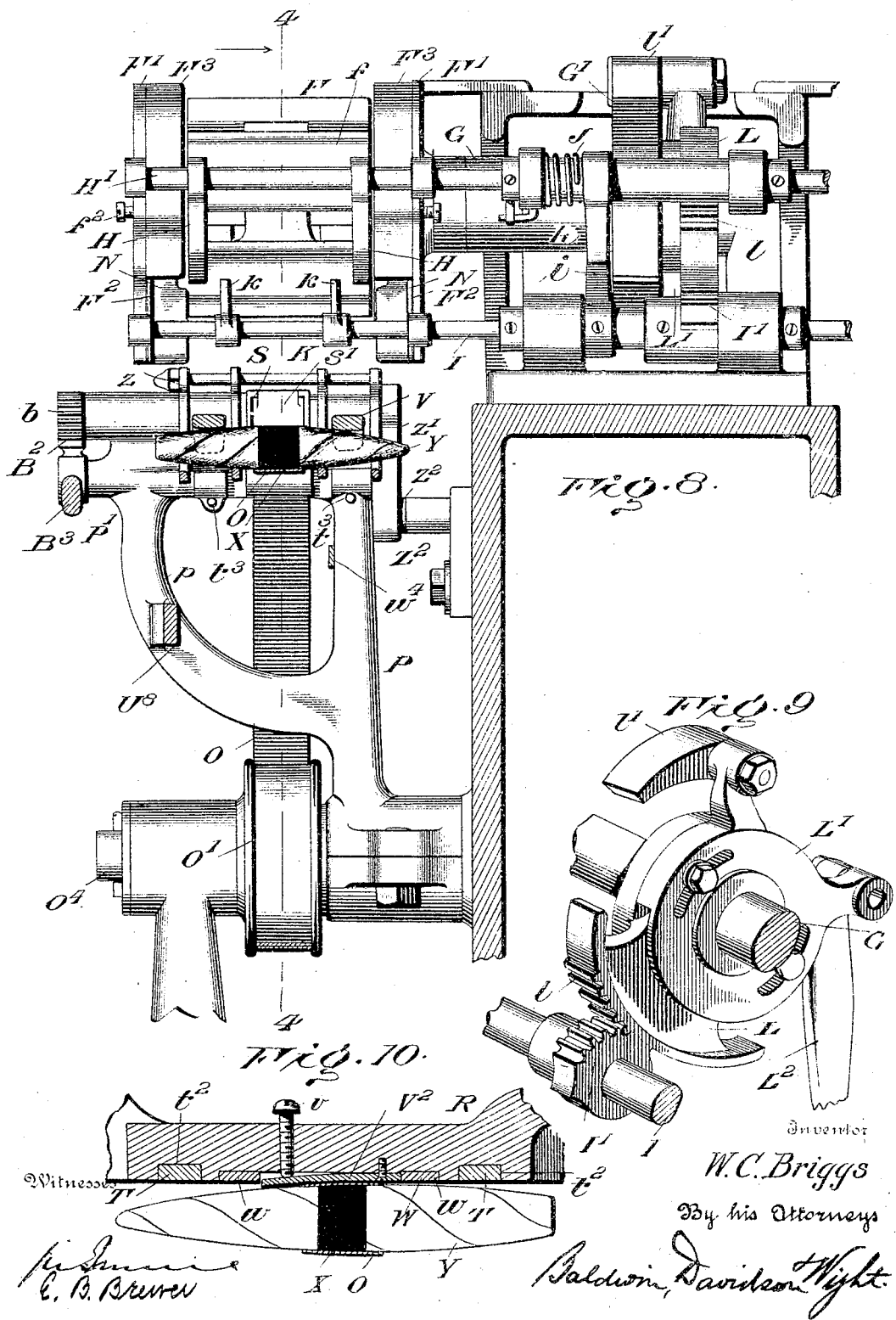

No. 764,707. PATENTED JULY 12, 1904.
W. C. BRIGGS.
MACHINE FOR APPLYING BANDS OR LABELS TO CIGARS OR OTHER ARTICLES.
APPLICATION FILED FEB. 17, 1904.
NO MODEL. 10 SHEETS—SHEET 5.
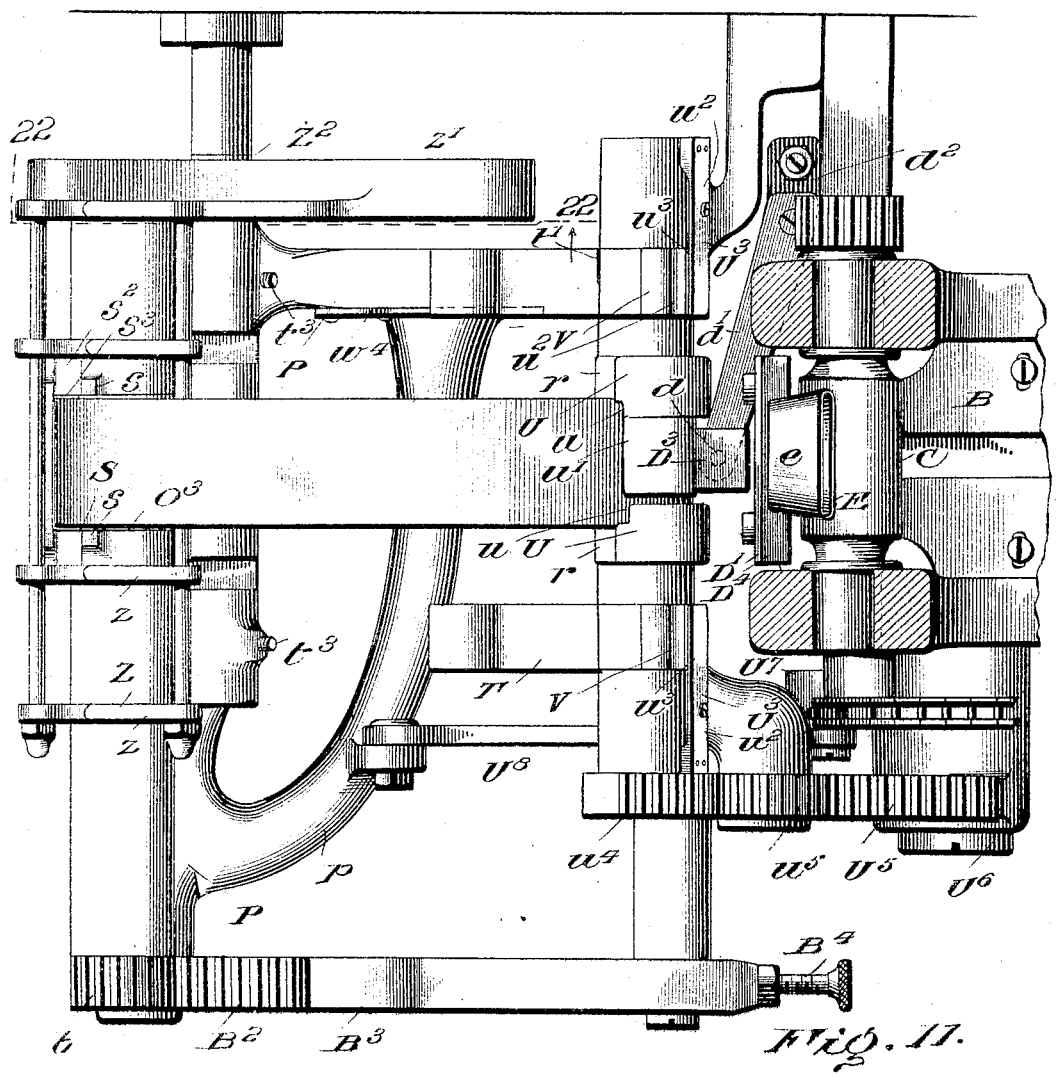
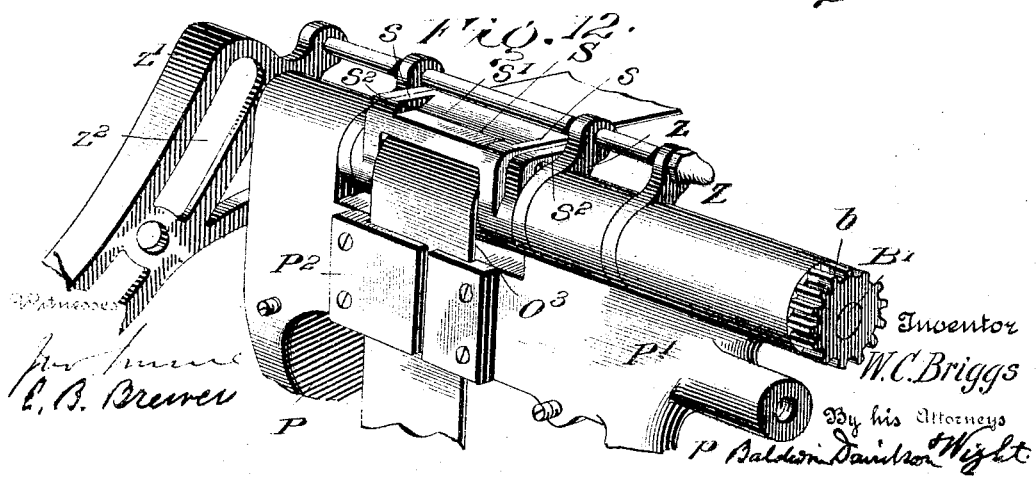

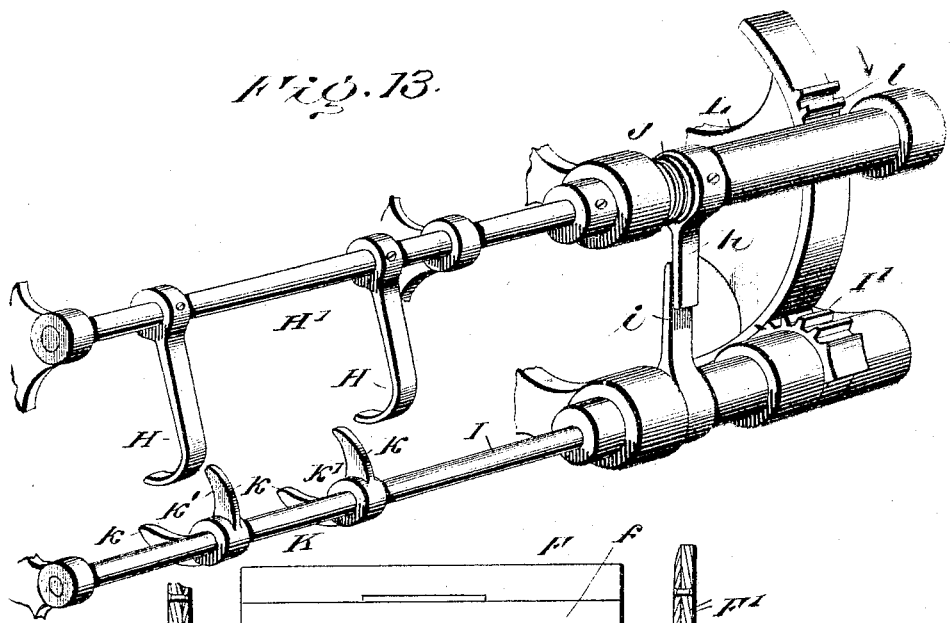
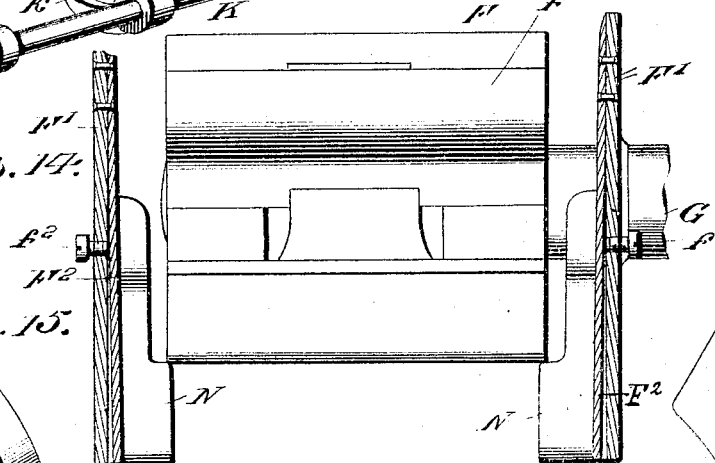
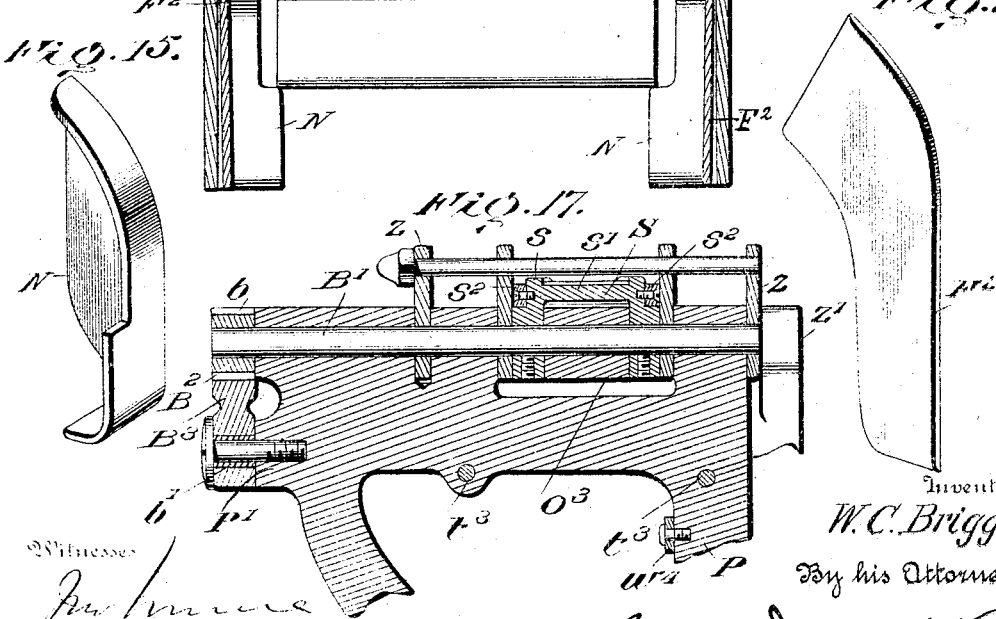

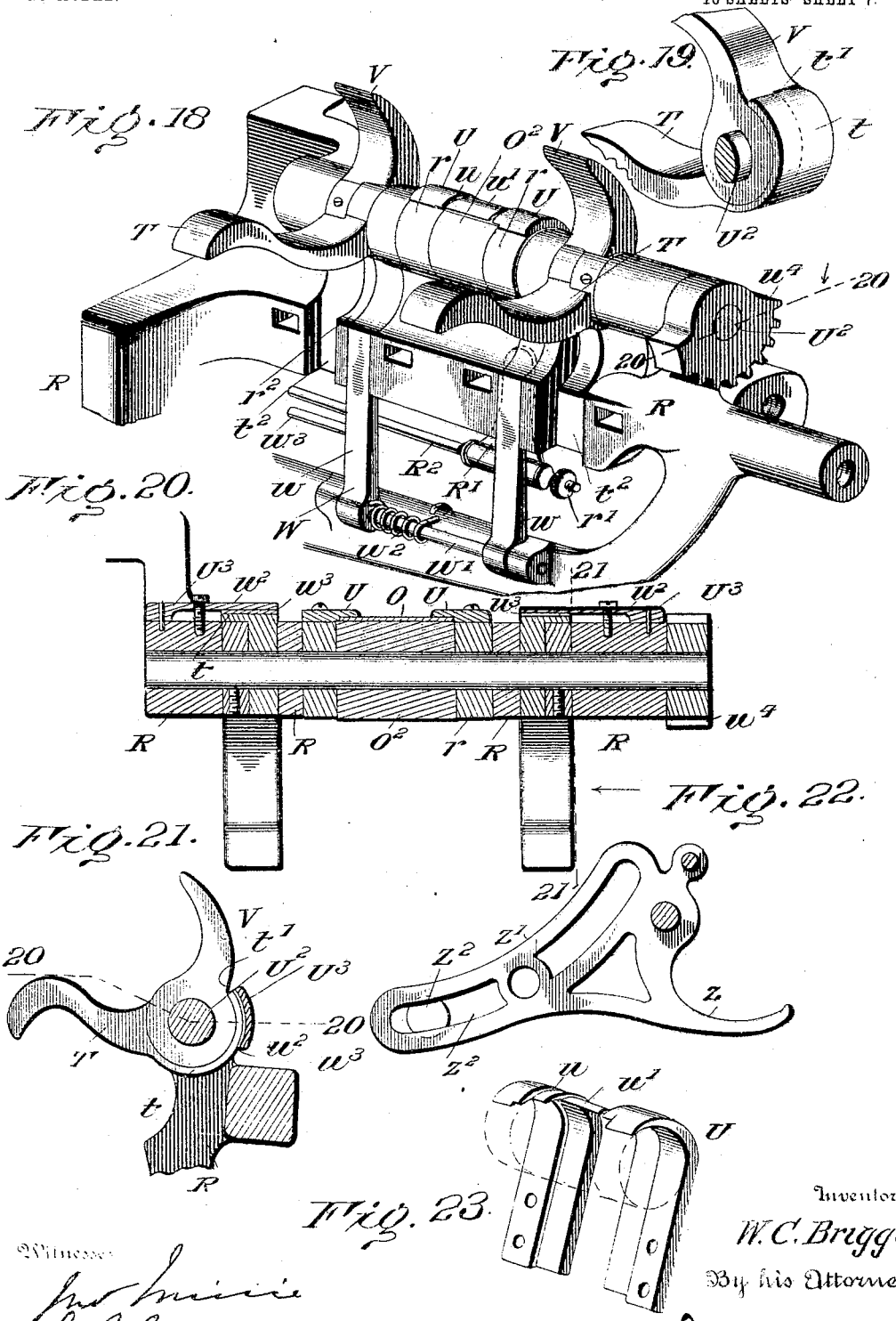

No. 764,707. PATENTED JULY 12, 1904.
W. C. BRIGGS.
MACHINE FOR APPLYING BANDS OR LABELS TO CIGARS OR OTHER ARTICLES.
APPLICATION FILED FEB. 17, 1904.
NO MODEL. 10 SHEETS—SHEET 8.
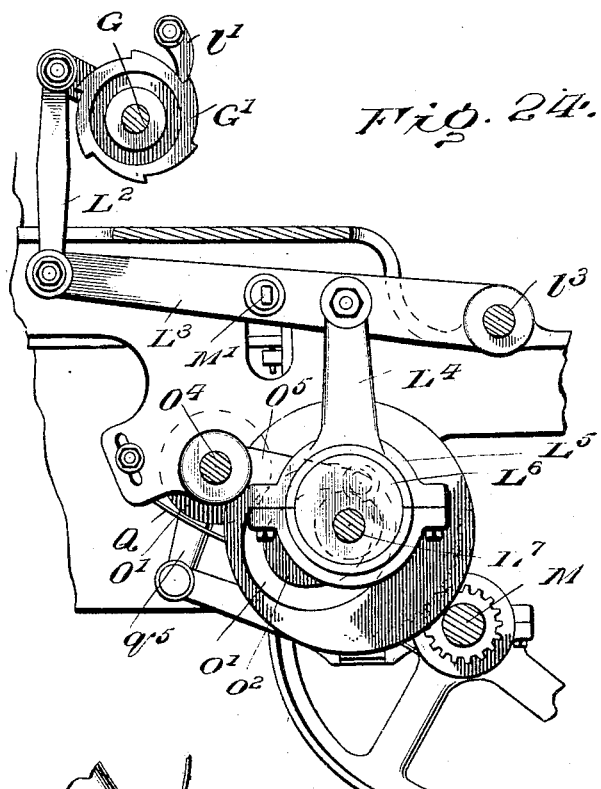
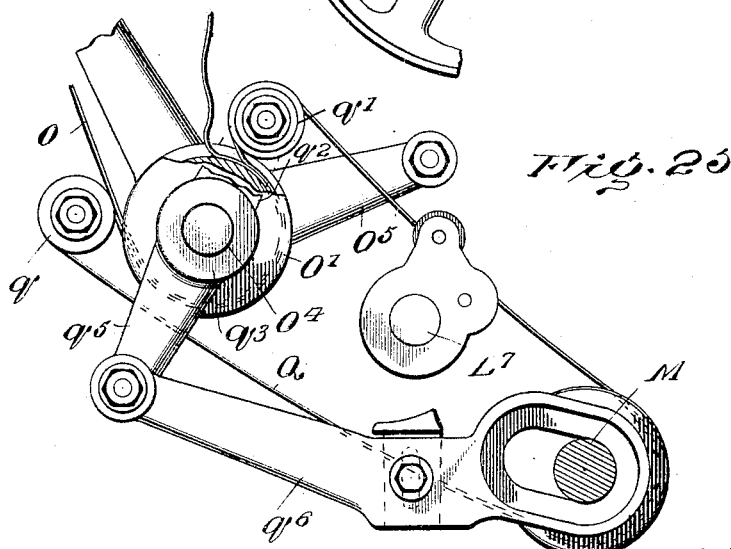

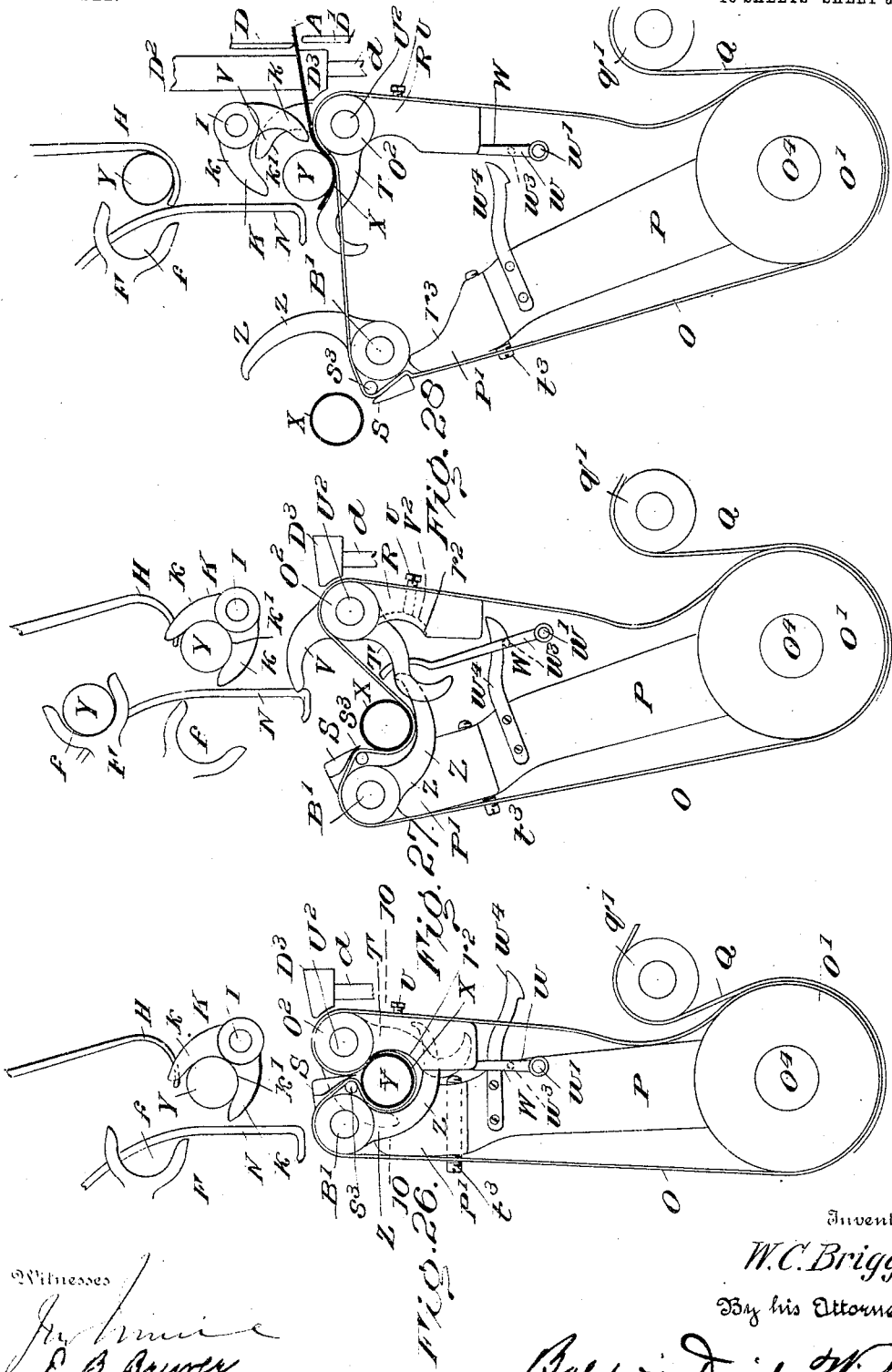

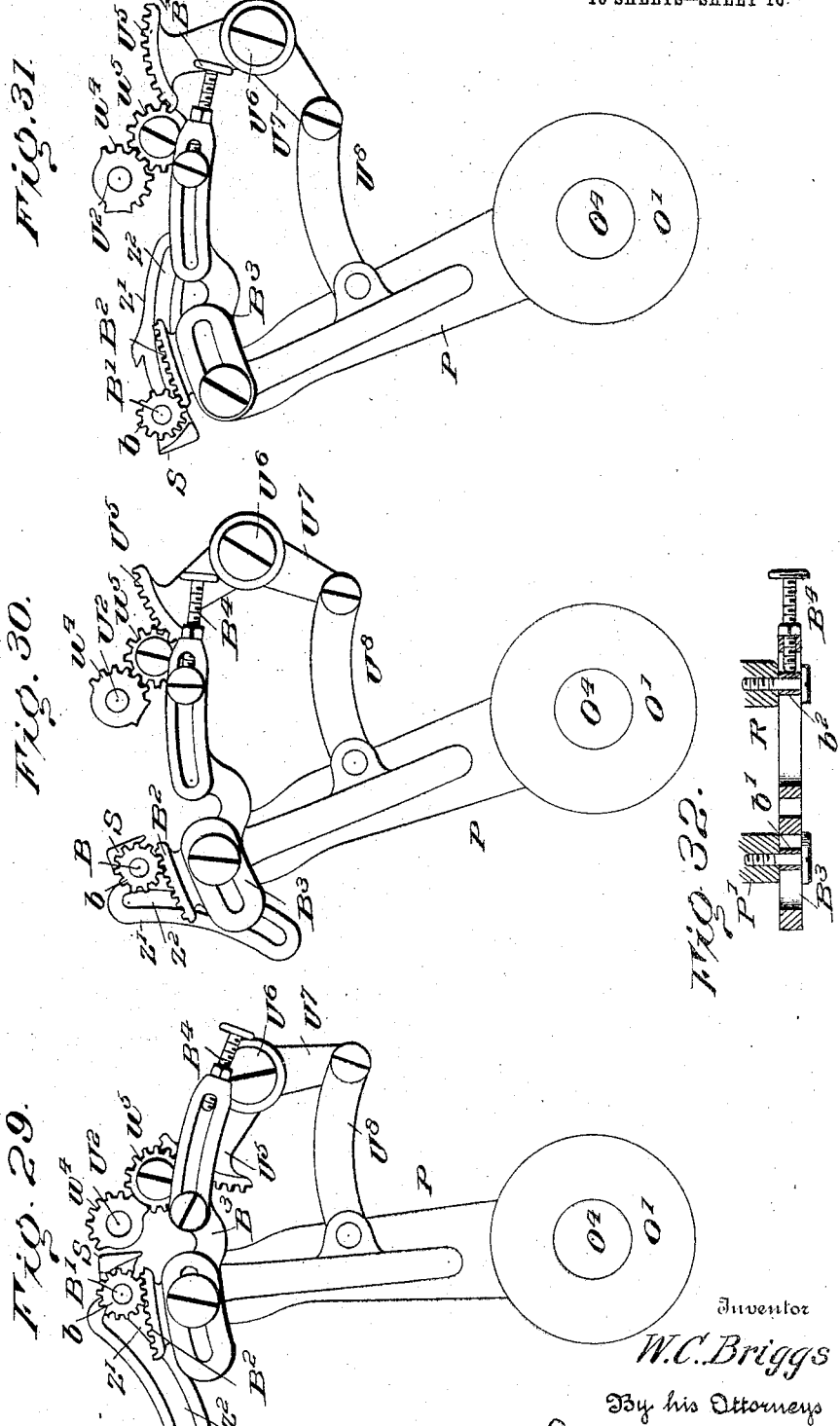

No. 764,707. Patented July 12, 1904.

UNITED STATES PATENT OFFICE.

WILLIAM CYRUS BRIGGS, OF WINSTON SALEM, NORTH CAROLINA.

MACHINE FOR APPLYING BANDS OR LABELS TO CIGARS OR OTHER ARTICLES.

SPECIFICATION forming part of Letters Patent No. 764,707, dated July 12, 1904.

Application filed February 17, 1904. Serial No. 193,999. (No model.)

*To all whom it may concern:*

Be it known that I, WILLIAM CYRUS BRIGGS, a citizen of the United States, residing at Winston Salem, in the county of Forsyth and State of North Carolina, have invented certain new and useful Improvements in Machines for Applying Bands or Labels to Cigars or other Articles, of which the following is a specification.

In my application for patent, Serial No. 149,836, filed March 27, 1903, (patented June 14, 1904, No. 762,681,) I have shown and described a machine especially adapted to apply bands or labels to cigars, but adapted also to apply bands or labels to other articles. In that machine the articles to be banded are fed by an endless carrier to a wrapping tape or belt which is at times slackened to receive the article to be labeled or banded and then have a pocket formed in it which incloses the article. While the pocket is being formed around the article a label enters the pocket and is wrapped around the article while the latter is being rotated by the longitudinal or endwise movement of the belt. In the machine of my prior application the bands or labels are supplied from a reel containing a strip or ribbon of indefinite length on which the labels are printed and which is cut up into proper lengths just prior to being fed to the wrapping devices. Each band or label just after it has been cut is supplied with a small quantity of paste near one end. After the band or label is applied to the article the banded or labeled article is ejected from the wrapping devices while the pocket is being opened.

The object of my present invention is to improve the construction and operation of the mechanism shown in my prior application.

In the prior machine if run at a very high rate of speed there was some danger of the cigars being delivered improperly to the tape or belt or of their dropping off sidewise from the belt if a narrow tape were employed or if the cigars were extra long. Sometimes when running at high speed the cigars would occasionally rebound from the tape when being fed to the wrapping devices or would be thrown up against the feed mechanism instead of being delivered quietly sidewise from the machine. According to my present invention I provide devices which enable me to use a tape or belt of any desired width for various lengths of cigars and to carry the cigars to the wrapping or label-applying devices and to deliver them therefrom properly and uniformly even when running at very high speed.

Briefly stated, my improvements comprehend certain devices which receive the cigars from the endless carriers which convey them from the hoppers toward the label-applying mechanism and which carry them positively toward the wrapping-tape and lay them gently upon it in such manner that there is no danger of the cigars being broken or of their rebounding from the tape. In order to support the cigar when it is first delivered to the wrapping mechanism, I employ a cradle having arms on opposite sides of the belt near the pocket-forming portion thereof which supports the cigar until the pocket is fully formed and until the tape with the label is drawn around the cigar. I also employ another cradle which receives the cigar after it is labeled or banded and which while the pocket is being opened raises the cigar and delivers it properly from the machine. There are also other features of invention embodied in my improved machine which will be hereinafter more particularly referred to.

In the accompanying drawings I have shown only that part of the mechanism of my banding or labeling machine to which my invention especially relates. The other parts of the machine may be assumed to be similar in all respects to that shown in my prior application above referred to.

Figure 1 is a perspective view looking from the right-hand side of the machine toward the rear end of the cigar-feed mechanism, some parts of the machine being omitted. Fig. 2 is a detail view in perspective of a shield employed for closing the mouth of the pocket in the belt and for preventing the pasted ends of the labels from coming in contact with the wrapping-tape. Fig. 3 is a perspective view of a label-guide which is located between the label-feed rolls and the cutters. Fig. 4 shows a vertical longitudinal section on the line 4 4 of Fig. 8. Fig. 5 shows a local section through the shield, the wrapping-tape, and the upper guide-rolls of the tape. Fig. 6 shows a side elevation of the cigar-feed mechanism and the wrapping mechanism. Fig. 7 is a perspective view of the ejecting-cradle. Fig. 8 shows a vertical section of the mechanism on the line 8 8 of Fig. 6. Fig. 9 is a detail view in perspective of part of the mechanism for actuating the feed-chains which carry the cigars from the hoppers toward the label-applying mechanism, and this figure also shows the means for actuating the shaft to which are secured the carriers that convey the cigars from the feed-chains to the label-applying mechanism. Fig. 10 shows a local horizontal section on the line 10 10 of Fig. 26, illustrating particularly the gage-plate employed to bend the wrapping-belt properly to fit the tapered portion of the cigars. Fig. 11 shows a horizontal section on the line 11 11 of Fig. 4. Fig. 12 is a perspective view of the upper portion of the oscillating arm traversed by the belt, the shield or guide, and other parts associated therewith. Fig. 13 is a perspective view of the catches which receive the cigars as they are delivered from the feed-chains and the carriers which convey the cigars to the label-applying mechanism. This figure also shows the manner in which the carriers and catches are actuated. Fig. 14 shows a vertical section of the cigar-feeding mechanism on the line 14 14 of Fig. 1. Fig. 15 is a perspective view of one of the guides which serve to direct the cigars from the pocket of the feed-chains into the catches. Fig. 16 is a perspective view of one of the adjustable plates located at the delivery end of the casings which inclose the feed-chains. Fig. 17 shows a vertical section on the line 17 17 of Fig. 6. This figure illustrates particularly the manner in which the ejecting-cradle and the shield are connected with the oscillating arm which opens and closes the pocket in the wrapping-belt. Fig. 18 is a perspective view illustrating particularly the receiving-cradle, the separating-arms, and other parts associated therewith. Fig. 19 is a perspective view illustrating certain details of the receiving-cradle. Fig. 20 shows a horizontal section on the line 20 20 of Figs. 18 and 21. Fig. 21 shows a vertical section on the line 21 21 of Fig. 20. Fig. 22 shows a section on the line 22 22 of Fig. 11 and illustrates particularly the cam which actuates the ejecting-cradle. Fig. 23 is a perspective view of the two guides which direct the wrapping belt or tape over one of the guide-rollers thereof. Fig. 24 is a view illustrating the mechanism for actuating the feed-chains. Fig. 25 is a view illustrating the mechanism for giving proper movement to the oscillating arm which serves to open and close the pocket of the wrapping-belt and the mechanism which actuates the driving-belt. Figs. 26, 27, and 28 are diagrams illustrating the manner in which the cigars are carried from the feed-chains to the label-applying mechanism and also the manner in which the cigars and labels are received by the label-applying mechanism and ejected therefrom. The upper part of Fig. 28 shows a cigar held by the catches and ready to be delivered to the carriers. Fig. 26 shows a cigar transferred from the catches to the carriers, and Fig. 28 also shows a cigar conveyed by the carriers and delivered to the receiving-cradle of the label-applying mechanism. Fig. 27 shows the wrapping mechanism in the act of opening after the label has been applied to a cigar. Fig. 26 shows the position of the parts while the belt is moving endwise and while the label is being wrapped around the cigar. Fig. 28 also shows the position of the parts while a labeled or banded cigar is being ejected. Figs. 29, 30, and 31 are diagrams illustrating the manner in which the guide or shield is moved into and out of the wrapping-pocket and also the mechanism for actuating the cigar-receiving cradle. Fig. 29 shows the position of the parts when the pocket is closed and the shield is moved inward to its full extent, as in Fig. 26. Fig. 30 shows the position of the parts after the opening of the pocket has commenced, as in Fig. 27, and Fig. 31 shows the position when the pocket is fully opened and the labeled cigar is being ejected and a new cigar is being received. Fig. 32 shows a horizontal section of part of the mechanism shown in Figs. 29, 30, and 31.

In the drawings I have shown my improvements adapted to a machine for applying bands or labels to cigars, and for convenience I will hereinafter confine the detailed description of the machine to such mechanism; but I wish it understood that I also contemplate using much of the mechanism herein shown and described for applying labels or bands to various other articles. In my prior machine the mechanism is shown as being constructed to apply bands or labels to two cigars simultaneously. In Figs. 1, 8, and 13 parts of the duplicate mechanism are shown; but it will be necessary to describe only the mechanism on one side of the machine.

As in the machine shown in my prior application, the labels, which may be printed on a continuous strip A, pass through a guide B and between feed-rolls C. These parts are precisely the same in construction and operation as those shown in my prior machine. The strip or ribbon of labels also passes between cutters D D', thence under a paste-wheel $D^2$ and over a spring-supported table $D^3$. The stem $d$ of this table rests on a spring $d'$, projecting from a bracket $d^2$, attached to a vertically-moving slide $D^4$, which carries the lower cutter D' and which is operated by an arm M', carried by the lever $L^3$. These parts are also similar to those in my prior machine. In the prior machine, however, there was a table on the upper end of the slide $D^4$, between the lower cutter and the feed-rollers, which assisted in guiding the labels. In my improved machine this table is dispensed with, and its place is taken by a guide E, which is shown detached in Fig. 3. This consists of an upper portion $e$, open at front and rear and inclosed on all four sides. It flares rearwardly and serves, as shown in Fig. 4, to direct the labels toward the wrapping mechanism. The opposite end of the guide is firmly attached to the main frame, as shown in Fig. 4. The curved intermediate portion $e'$ of the guide is made sufficiently thin to give to it a certain amount of elasticity and the arrangement is such that when the slide $D^1$ rises with the lower cutter the part $d^3$ of the slide comes in contact with the head of the guide and moves it upwardly until the edges of the cutters have passed each other and the band or label has been severed. As soon as the slide $D^1$ lowers the guide springs back to its original position and holds the paper strip in alinement to properly feed the next label. By these improvements I avoid any tendency of the front or leading end of the paper from sticking to the upper cutter or from being turned up at its leading end so as not to properly feed forward.

I am aware that in other machines for cutting paper devices have been employed for stripping the leading end of the paper from the cutters for a similar purpose. Such devices are applicable to my prior machine and also to the present machine; but I prefer to use a guide such as shown in the annexed drawings.

After a label of proper length has been cut off it is drawn forward by the wrapping devices, and at the proper time a sufficient amount of paste is applied in the manner described in my prior application.

Before describing the construction and operation of the wrapping or label-applying devices I will describe certain improvements which I have made in the mechanism for delivering the cigars to the wrapping mechanism.

The cigars, as described in my prior application, are placed in a hopper and are fed toward the wrapping mechanism by means of a feed-chain F, having pockets $f$, each adapted to contain one cigar. The feed-chain is arranged between side plates F', which prevent the cigars from moving endwise out of the pockets. It is desirable that the cigars should be delivered to the wrapping mechanism in such manner that the bands or labels may be applied thereto in the same relative position on the cigars, so that when the cigars are packed in boxes the labels shall all be in line with each other. In order to insure this, I preferably arrange at the rear ends of the side plates F' gage-plates $F^2$. These, as shown in Fig. 14, are secured at their upper ends to the side plates F', and they are made adjustable by set-screws $f^2$. Only a slight adjustment is required, and this adjustment is permanent for cigars of the same length. Curved guide-flanges $F^3$ are secured to the side plates F' at their rear ends and serve to prevent the cigars from rolling out of the pockets of the feed-chain when passing around the shaft G at the rear end of the feed-chain. As the cigars pass downwardly toward the wrapping devices they are received by catches H, consisting of fingers having curved ends and secured to a rod H', mounted to turn in suitable bearings in the frame or casing of the feed-chain in the manner indicated clearly in Fig. 1. The catches H are rigidly secured to the rod H', and this rod carries an arm $h$, which is adapted to engage with an arm $i$, extending from the rod I, hereinafter referred to. A helical spring J, secured to the frame and to the rod H', normally holds the catches H in the position shown in Fig. 4; but at times the rod H' is turned, by reason of the engagement of the arm $h$ with the arm $i$, so that the catches are moved outward to the position shown in Figs. 26 and 27. When moved to this latter position, the catches deliver the cigars to a carrier K, secured to the rod I. The carrier is shown as consisting of arms $k$, having between them pockets $k'$ to receive the cigars. Each cigar is received by a carrier preferably consisting of four arms $k$, as indicated in Fig. 13, although the construction of the carrier may be varied.

The rod I is mounted to turn in suitable bearings in the frame of the machine and near one end has secured to it a mutilated pinion I', adapted to gear with teeth $l$ on an oscillating segment L. The arrangement is such that as the segment L oscillates the rod I is correspondingly oscillated and causes the carriers to be moved in such manner as to take the cigars from the catches H and deliver them to the wrapping mechanism. The segment L, as shown in Fig. 9, is adjustably connected with a hub L', loose on the shaft G, and which carries a pawl $l'$, that engages the ratchet-wheel G', that drives the shaft G. The hub L' is connected by means of a pitman $L^2$ with a lever $L^3$, pivoted at $l^3$ to the main frame, as shown in Fig. 24, and actuated by an arm $L^4$, projecting upwardly from a ring $L^5$, surrounding an eccentric $L^6$ on the shaft $L^7$, driven from the main driving-shaft M in the manner described in my before-mentioned application. The mechanism is so constructed and so timed that when the feed-chain F delivers a cigar the catches H are in the position shown in Fig. 28 and the carrier K is in the position indicated in the same figure. The carrier is then, by means of the gearing before described, moved to the position shown in Fig. 27, and the cigar rolls from the catches into the carrier. Then the movement of the rod I is reversed, the catches being moved to their vertical position by means of the spring J, while the carrier is turned downward and delivers the cigar to the wrapping mechanism. These movements are repeated step by step correspondingly with the movement of the feed-chain, so as to catch each cigar as it is delivered by the chain and deliver it separately and properly to the wrapping mechanism.

In order to insure that the cigar shall leave properly at the right time the pockets of the feed-chain and in order to guide them while they are being conveyed by the carrier from the catches to the wrapping mechanism, I employ guide-plates N. These are of the form shown in Fig. 15, and they are located on opposite sides of the delivery end of the casing inclosing the feed-chains. The manner in which these guide-plates act is clearly indicated in Figs. 26 to 28.

In general outline, as will be observed by reference to Fig. 4, the wrapping mechanism or label-applying mechanism of my improved machine are quite similar to those in the prior machine. The endless tape or wrapping-belt O passes around a drum O' and about rollers $O^2 O^3$. The drum O' is carried loosely on a shaft $O^4$, mounted in suitable bearings in the frame of the machine. To this shaft $O^4$ is attached an arm $O^5$, having a roller $o$, which enters a groove $o'$ in a cam-wheel $o^2$, which is revolved in a suitable way and at suitable speed to oscillate the shaft $O^4$ at the proper time to give the movements hereinafter referred to, which are similar to those in the prior machine. To the shaft $O^4$ is secured an arm P, on the upper end of which is a bracket P', in which the roller $O^3$ has its bearings. The arrangement and operation are such that the arm P is oscillated, so as to move the roller $O^3$ toward and from the roller $O^2$ in the manner and for the purpose hereinafter explained. A brace $p$ connects the outer end of the bracket P' with the lower portion of the arm P in the manner indicated particularly in Fig. 8. The driving-belt Q passes around the lower portion of the drum O' in contact with the wrapping-belt O. It also passes over an idle pulley $q$ on a stationary shaft and around an idle pulley $q'$, carried by an arm $q^2$, projecting from a hub $q^3$, loosely mounted on the shaft $O^4$. From this hub projects another arm $q^5$, which is connected with a pitman $q^6$, by means of which proper movements are given to the arm to move the roller $q'$ in such manner as to tighten or loosen the driving-belt. This mechanism is also precisely the same in construction and operation as that in my prior machine. Most of the operating mechanism is clearly illustrated in Fig. 25, but need not be further described.

The guide-roller $O^2$ is mounted in a bracket R, attached to the main frame. On opposite sides of the roller $O^2$ are smaller rollers $r$ $r$, which are adapted to make contact with the rails on opposite sides of a shield S in the manner hereinafter described. In order to apply tension to the belt below the roller $O^2$, I employ a spring-metal plate R', the upper portion of which presses the belt against the rear side of the bracket R. The lower portion is formed with a hub which encircles the reduced portion of a rod $R^2$, attached to the bracket. The outer end of the rod is threaded and receives a hand-nut $r'$, which is adapted to press against the hub and force it against the shoulder of the rod at the inner end of the reduced portion. The arrangement is such that by loosening the nut the spring-finger may be adjusted to the desired position and then held in this position by screwing the nut home so as to press the hub firmly against the shoulder. The belt passes between guides U, which are clearly shown in Fig. 23. These guides are securely attached to the bracket R below the roller $O^2$, and their upper ends are curved forwardly and extended part way over the roller in the manner indicated in Figs. 18 and 23. The upper curved ends of the guides are recessed at $u$, which serve to guide the bands or labels and prevent lateral movement thereof while they are being fed toward the wrapping devices. From one of the guide-pieces U projects a flange or plate $u'$, beneath which the bolt O passes and over which the label moves as it is fed to the belt. The purpose of this flange is to prevent the front edge of the label from being caught by the belt and held back, the plate or flange $u'$ being so arranged as to cause the leading or front end of the label to slide onto the belt, above the top surface thereof, in the manner clearly indicated in the drawings. The rollers $O^2$ and $r$ are mounted to revolve freely on a shaft $U^2$, which carries also a cradle for the cigars, which is shown as consisting of two arms T, arranged on opposite sides of the roller $O^2$, and hence on opposite sides of the wrapping-belt. These cradle-arms, while mounted loosely on the shaft $U^2$, are prevented from moving freely thereon by means of friction-brakes $U^3$, consisting of plates $u^2$, attached to the bracket R and carrying pieces of leather or similar material $u^3$, bearing on the hubs of the arms T. The cradle-arms coöperate with curved arms V, fast on the shaft $U^2$, as indicated in Figs. 18 and 20. The hubs of the cradle-arms T have flanges $t$, that partially incase the hubs of the arms V in the manner indicated in Fig. 19, the arrangement being such that when a cigar is supported in the cradle-arms and the shaft $U^2$ is turned in the proper direction the arms V will press the cigar down upon the cradle-arms T, which will then descend with the cigar to carry it into the pocket of the wrapping-belt. As the movement of the shaft $U^2$ is reversed and the arms V rise the shoulders $t'$ on the hubs of the arms V will come in contact with the flanges $t$ and will raise the cradle-arms to their upper or horizontal position. By this arrangement the cradle-arms are caused to descend with the cigar; but the friction devices are such that no such pressure is imparted to the cigar as would be liable to break or crack it. As will be observed by reference to Figs. 4, 15, and 28, the lower ends of the plates N are curved, and these curved ends lie close to the front ends of the cradle-arms T when the latter are in their elevated position. They assist in causing the cigar to properly settle in the cradle, and when the arms V start to move downward the lower curved ends of the plates retain the cigar in the cradle, preventing it from being moved when the arms V are being turned. The outer end of the shaft $U^2$ carries a mutilated pinion $u^4$, engaging another mutilated spur-wheel $u^5$, in turn engaging a segment of teeth $U^5$, which oscillates around a stud-shaft $U^6$. The segment $U^5$ connects with an arm $U^7$, joined by a link $U^8$ with the oscillating arm P. By this mechanism the shaft $U^2$ is oscillated in such manner as to cause the cradle T to descend as the pocket is being formed in the wrapping-belt and to rise as the pocket is being opened to deliver a labeled or banded cigar.

The bracket R is formed with a curved portion $r^2$, corresponding with a similar curved portion $r^3$ in the bracket P'. The cradle-arms T are adapted to pass into recesses $t^2$ in the bracket R when they are moved downwardly to their full extent, and in order to cause the cradle-arms to move into these recesses, so that they may be separated from the cigar while the label is being wrapped around it, I employ adjustable screws $t^3$, carried by the bracket P' and which abut against the ends of the cradle-arms as the parts come together in the manner indicated in Fig. 26.

It sometimes happens that the cigar will adhere to the curved wall $r^2$ of the bracket R after the parts have been brought together and the band has been applied. In order to insure the separation of the cigar from the bracket R, I employ a separator W, preferably consisting of fingers $w$, secured to a rod $w'$, mounted to oscillate in bearings, as indicated in Fig. 18, and whose movement is controlled by a spring $w^2$. One of the fingers carries a laterally-projecting pin $w^3$, with which is adapted to engage a hook $w^4$, attached to the oscillating arm P. The manner in which these devices operate is indicated clearly in Figs. 26 to 28, inclusive. In Fig. 28 the separator is shown in its normal position in the bracket R. As the arm P moves toward the bracket R the hook $w^4$ passes over the pin $w^3$ and finally assumes the position shown in Fig. 26. When the movement of the arm P is reversed, the hook engages the pin $w^3$ and pulls the separator forward in the manner indicated in Fig. 27, thus causing the cigar to be separated from the bracket R. The continued movement of the arm P causes the hook $w^4$ to be disengaged from the separator, and the latter is made to assume its normal position by the spring $w^2$.
It is desirable that the tape or wrapping-belt should press the bands or labels closely around the cigar while they are being applied thereto, and inasmuch as most cigars are tapered I preferably employ a device, such as indicated in Fig. 10, for pressing the belt into contact with the cigar. This device, as shown, merely consists of a plate $V^2$, secured to the bracket R and made adjustable by means of a set-screw $v$. The plate is curved in the manner indicated in Fig. 4 to conform to the shape of the curved recess in the bracket R.

The roller $O^3$ is free to revolve on a rod B', mounted in bearings in the bracket P'. The shield S is similar in general construction and operation to that heretofore employed by me; but it is also slightly improved. As shown in Figs. 2 and 17, the shield is formed with end pieces $s$, connected by a cross-piece $s'$. The hubs of the end pieces are rigidly attached to the rod B', and the cross-piece $s'$ is hollowed or curved, as indicated in Fig. 5, so that the shield may come close to the roller $O^3$. The end pieces are formed with rails $s^2$, which are adapted to bear against the rollers $r$, and thus the shield is prevented from coming in direct contact with the roller $O^3$. The wrapping-belt passes beneath the cross-piece $s'$; but the rear end of the shield is provided with a roller $s^3$, in contact with which the belt moves. This roller is free to turn in its bearings, and hence the movement of the belt after the pocket is formed and when the label is being applied is materially facilitated, as will be apparent from inspection of Fig. 5. The roller also serves to further close the mouth of the pocket, and thus prevent the leading end of the band or label from passing out of the pocket should it tend to do so before it is completely wrapped around a cigar. The manner in which the shield is moved at the proper time will be described later on. Another important function of the roller $s^3$ is to provide a bearing-surface for the cigar at the mouth of the pocket. In my prior machine the cigar was drawn up against a stationary or dead surface, while in the improved machine it is drawn against a roller, which materially facilitates the even and regular application of the band.

Just below the shield the bracket P' is provided with a guide $P^2$ for the wrapping belt, as indicated in Fig. 12. This guide is not shown as provided with special tension devices, as these are not necessary at this point.

In my prior machine the banded or labeled cigars were raised and delivered by the belt. When the machine was operated at a high speed, the cigars were raised so quickly that they sometimes were thrown up against the feed mechanism by the wrapping mechanism. In order to avoid this and to operate the machine at high speed, I have provided means for raising the cigars and delivering them independently of the movement of the wrapping-belt. For this purpose I employ an ejecting-cradle Z, the preferred form of which is shown in perspective in Fig. 7. As there shown it consists of a series of curved fingers $z$, suitably connected and held at proper distances apart. This cradle is mounted to revolve loosely around the rod B'; but it is connected with a cam $z'$, formed with a long cam-groove $z^2$, into which projects a truck or roller $Z^2$, supported on the main frame in any suitable way—such, for instance, as that shown in Fig. 6. The arrangement is such that as the arm P is oscillated the roller $Z^2$ and cam-groove $z^2$ cause the cradle to be given a movement independent of the arm P, this movement being such as to cause the cradle to turn about the rod both while the pocket is being formed and while it is being opened.

Before describing the particular manner in which the cradle operates I will describe the mechanism for giving movements to the shield S. As before stated, the shield is rigidly secured to the rod B'. This rod on its outer end has secured to it a spur-wheel $b$, which meshes with a segment of teeth $B^2$, carried by a slotted frame $B^3$. The slot in the front end of this frame is curved in an arc struck from the axis of the shaft $O^4$, and this slot receives a roller $b'$, free to turn on a stud-shaft attached to the bracket P'. The rear end of the frame $B^3$ is also slotted and receives a roller $b^2$, supported on the bracket R. The frame $B^3$ is adapted to be moved back and forth with the rollers $b'$ and $b^2$ as guides. The rear end of the frame $B^3$ carries an adjustable screw $B^4$, which is adapted at times to strike against the roller $b^2$ and limit the forward movement of the frame, the rearward movement of the frame being limited by the front end of the rear slot. Similarly the forward and rearward movement of the frame $B^3$ relatively to the bracket P' is limited by the roller $b'$, which is adapted to strike against the front and rear ends of the front slot.

The operation of the wrapping mechanism will now be best understood by reference to Figs. 26 to 32, inclusive. In Fig. 28 the arm P after having been moved forwardly to its full extent—viz., to the position shown in Fig. 4—has been moved a short distance inward or rearward, so as to give a slight slack to the wrapping-belt O, and a cigar Y has been dropped onto the belt and onto the cradle T by the carrier K. A label X has already been fed across the end of the outer portion of the belt and received the cigar Y as it was delivered by the carrier K. After the first label has been cut from a continuous series of labels the arm P moves farther inward and the belt sags to form the pocket. In doing so the cradle T is depressed in the manner before described; but before the cradle has descended to any great extent the ejecting-cradle Z is moved rearwardly and downwardly, so as to pass beneath the plane of the cigar as it descends with the receiving-cradle T. After the arm P has moved rearward to its full extent the cradle T will be moved out of engagement with the cigar, as clearly shown in Fig. 26. At this time the cigar is supported solely by the wrapping-tape, and as this tape revolves the label is wrapped around the cigar. By this means and this method of operation the machine is made capable of acting on cigars of varying diameters. When the arm P commences to move forward, both cradles T and Z rise and the pocket in the belt opens. Just before the arm P has moved to the position shown in Fig. 27 the separator W is operated to separate the cigar from the bracket R should it tend to adhere thereto. As the arm P moves farther forward the ejecting-cradle Z lifts the cigar off of the belt and delivers it in the manner indicated in Fig. 28.

The mechanism is so operated that when a cigar is delivered to the wrapping mechanism the belt is slackened and the cigar is supported not only by the wrapping-belt, but also by the receiving-cradle. The shield S is not inserted into the pocket formed in the belt until the latter is nearly closed. After the cigar has been banded the pocket is opened gradually and the ejecting-cradle lifts the banded cigar gradually and moves it to some extent horizontally before the belt has been straightened out. In fact, this horizontal movement is given to the cigar while the belt is being straightened out, and thus any tendency of the cigar to jump up vertically against the cigar-feeding mechanism is entirely avoided. The wrapping devices are not only adapted to accommodate cigars of different lengths, but also of different diameters, because the slack which forms the pocket is more than sufficient to accommodate the largest cigars, while the pocket is reduced in size and the belt is drawn closely around the cigar before the latter is rotated.

The devices for feeding the cigars to the wrapping or label-applying mechanism are so timed as to deliver the cigars at just the right time to correspond with the supply of labels. When the feed-chain carries a cigar to the position shown in Fig. 28, the catches receive it and hold it while another cigar is being banded, until it is ejected, and until the carrier rises to approximately the position shown in Fig. 26. At this time the catches are moved rearward to deliver the cigar to the carrier. The cradle T is also operated in proper time to rise to the position shown in Fig. 28 just before the carrier moves to the position shown in that figure, and the label is of course fed over the belt while the latter is distended and before the cigar leaves the carrier.

I claim as my invention—

1. The combination with label-applying mechanism, of mechanism for feeding the articles to be labeled toward the label-applying mechanism one at a time, devices for catching the articles as they are delivered by the feeding mechanism, devices for moving the articles into the catches, and means which receive the articles from the catches and carry them to the label-applying mechanism.

2. The combination with label-applying mechanism, of mechanism for feeding the articles to be labeled one at a time toward the label-applying mechanism, a carrier having a pocket which receives an article from the feed mechanism and conveys it from the feed mechanism to the label-applying mechanism, and a guide for holding the articles in the carrier.

3. The combination with label-applying mechanism, of mechanism for feeding the articles to be labeled toward the label-applying mechanism, means for carrying the articles from the feed mechanism to the label-applying mechanism, and a cradle which receives the articles and moves them positively into the label-applying mechanism.

4. The combination with label-applying mechanism, of mechanism for feeding the articles to be labeled toward the label-applying mechanism, means which receive the articles from the label-feeding mechanism and carry them to the label-applying mechanism, a cradle which receives the articles from the carrier, and means for raising and lowering said cradle.

5. The combination with label-applying mechanism, of mechanism for feeding the articles to be labeled toward the label-applying mechanism, catches for receiving the articles from the article-feeding mechanism, an oscillatory carrier for conveying the articles from the catches to the label-applying mechanism and a guide for confining the articles in the carrier.

6. The combination with label-applying mechanism, of mechanism for feeding the articles to be labeled toward the label-applying mechanism, catches which receive the articles from the label-feeding mechanism, a guide which directs the articles from the feeding mechanism to the catches and an oscillating carrier for conveying the articles from the catches to the label-applying mechanism.

7. The combination with label-applying mechanism, of a feed-chain for conveying articles toward the label-applying mechanism, a frame or casing for the chain, an adjustable plate carried by the casing at the delivery end of the chain for varying the width of the delivery-opening and an oscillating carrier for conveying the articles to be labeled from the feed-chain to the label-applying mechanism.

8. The combination with label-applying mechanism, of mechanism for conveying articles to be labeled toward the label-applying mechanism, catches which receive an article to be labeled and hold it while another article is being delivered to the label-applying mechanism, a carrier which receives an article to be labeled from the catches, holds it while another article is being labeled and afterward conveys it to the label-applying mechanism and devices for holding the article in the carrier while being conveyed thereby.

9. The combination with label-applying mechanism, of mechanism for feeding articles step by step and one at a time toward such mechanism, an oscillating carrier for conveying the articles to be labeled to the label-applying mechanism, a ratchet-wheel for operating the article-feeding mechanism, means for actuating the ratchet-wheel step by step, and devices operatively connected with said ratchet-wheel-operating mechanism for actuating the carrier.

10. The combination with label-applying mechanism, of an endless carrier for conveying articles to be labeled toward the label-applying mechanism, a ratchet-wheel operatively connected with said carrier, means for actuating said ratchet-wheel step by step, a carrier for conveying the articles to be labeled from the carrier to the label-applying mechanism and gearing connecting said carrier with the mechanism which actuates the ratchet-wheel.

11. The combination with label-applying mechanism, of means for feeding the articles to be labeled toward the label-applying mechanism, a carrier for conveying the articles from the feed mechanism to the label-applying mechanism, catches which receive the articles from the feed mechanism and deliver them to the carrier, a spring for holding the catches in position to support an article and a tripping device actuated by the carrier for moving the catches to cause them to deliver the article to the carrier.

12. In a machine for applying bands or labels to cigars or other articles, the combination of label-applying mechanism, and a cradle upon which the article is first deposited and which assists in supporting it while being inclosed in the label-applying mechanism.

13. In a machine for applying bands or labels to cigars or other articles, the combination with a wrapping-belt, of a cradle which receives the article to be wrapped and supports it on opposite sides of the wrapping-belt.

14. In a machine for applying bands or labels to cigars or other articles, the combination of a wrapping-belt, means for forming a pocket therein, and a cradle which receives the article to be wrapped before the pocket is formed and assists in supporting the article while the latter is being inclosed by the wrapping-belt.

15. In a machine for applying bands or labels to cigars or other articles, the combination of a wrapping-belt, means for forming a pocket therein, and a supporting-cradle which receives the article to be wrapped and comprises curved arms arranged on opposite sides of the belt and which are movable inwardly with the belt while the pocket is being formed.

16. In a machine for applying bands or labels to cigars or other articles, the combination of a wrapping-belt, means for forming a pocket therein, and a cradle normally held elevated and serving to assist the belt in supporting the article while the pocket is being formed.

17. In a machine for applying bands or labels to cigars or other articles, the combination of a wrapping-belt, guide-rollers for the belt, guides through which the belt passes and which extend above one of the rollers and have a label-guide therein, a plate bearing on the belt between said guides and devices for adjusting the position of said plate to vary the pressure thereof upon said belt.

18. In a machine for applying bands or labels to cigars or other articles, the combination of a wrapping-belt, guide-rollers therefor, guides through which the belt passes and which extend above one of the rollers and have a label-guide therein and a plate between the guides over which the label passes.

19. In a machine for applying bands or labels to cigars or other articles, the combination of a wrapping-belt, guide-rollers therefor, guides for directing the belt over the rollers and a flange or plate covering a portion of one of the rollers under which the belt passes and over the upper surface of which the label moves when passing onto the belt.

20. In a machine for applying bands or labels to cigars or other articles, the combination of a wrapping-tape, means for forming a pocket in the tape and for moving the tape endwise, and devices for bending the tape in line with its longitudinal axis to conform to the shape of the article being labeled.

21. In a machine for applying bands or labels to cigars or other articles, the combination of a wrapping-belt, means for guiding the belt and for moving it endwise, means for forming a pocket in the belt, a concaved or dished plate adapted to engage the belt after the pocket is formed, and means for adjusting this plate to bend the belt in line with its longitudinal axis at the pocket-forming portion thereof.

22. In a machine for applying bands or labels to cigars or other articles, the combination with label-applying mechanism, of mechanism for feeding the articles, a cradle which receives the articles as they are fed, devices for holding the articles in the cradle, and means for moving the cradle with the articles into engagement with the label-applying mechanism.

23. In a machine for applying bands or labels to cigars or other articles, the combination with wrapping mechanism, of a cradle which receives the article to be wrapped comprising arms free to oscillate in vertical planes, friction devices for holding the arms in the position to which they are positively moved, curved arms above the cradle adapted to engage the article to be wrapped and depress it with the cradle, and devices carried by said positively-moving arms which engage the cradle and elevate it.

24. In a machine for applying bands or labels to cigars or other articles, the combination of an oscillating arm, a wrapping-belt carried thereby, means for guiding the belt for moving it endwise and for forming a pocket therein, a cradle which receives the article to be wrapped and delivers it to the wrapping-belt, positively-actuated arms which press the article with the cradle into the pocket of the belt and gearing connecting said positively-actuated arms with said oscillating arm whereby said positively-actuated arms are depressed and raised as the oscillating arm moves back and forth to close and open the pocket of the belt.

25. In a machine for applying bands or labels to cigars or other articles, the combination of a wrapping-belt, means for actuating it and for forming a pocket therein, a casing surrounding the pocket-forming portion of the belt, a separator for detaching the article after it is labeled from the casing, and means for actuating said separator.

26. In a machine for applying bands or labels to cigars or other articles, the combination with label-applying mechanism, of a cradle for supporting the labeled article and for delivering it laterally from the label-applying mechanism.

27. In a machine for applying bands or labels to cigars or other articles, the combination of wrapping devices and a cradle which after the article has been banded or labeled raises the article and moves it laterally away from the wrapping devices.

28. In a machine for applying bands or labels to cigars or other articles, the combination of a wrapping-belt, means for forming a pocket therein, a cradle arranged beneath the article when the pocket is closed, and means for actuating the cradle to raise the article as the pocket is being opened and to move it laterally away from the wrapping devices.

29. In a machine for applying bands or labels to cigars or other articles, the combination with wrapping devices of a cradle which receives the article to be banded and another cradle which receives the articles to be banded from the first-mentioned cradle and which after the article is banded raises it and delivers it laterally away from the wrapping devices.

30. In a machine for applying bands or labels to cigars or other articles, the combination of a wrapping-belt, means for forming a pocket therein, a cradle arranged below the article while the latter is being banded and means for actuating the cradle to deliver the article from the wrapping devices.

31. In a machine for applying bands or labels to cigars or other articles, the combination of a wrapping-belt, means for forming a pocket therein and for straightening the belt to remove the pocket and a cradle which while the article is being banded is arranged below the pocket and which gives a lateral movement to the banded article before the belt is straightened out.

32. In a machine for applying bands or labels to cigars or other articles, the combination of a wrapping-belt, means for forming a pocket therein, a cradle which receives the article to be banded before the pocket is formed, another cradle which receives the article from the first-mentioned cradle and means for actuating said last-mentioned cradle to eject or deliver the labeled or banded article from the wrapping devices.

33. In a machine for applying bands or labels to cigars or other articles, the combination of a wrapping-belt, rollers on which it is supported and guided, an oscillating arm carrying one of said rollers, an ejecting-cradle pivotally mounted on said arm, and means for moving said cradle about its pivot as the arm oscillates.

34. In a machine for applying bands or labels to cigars or other articles, the combination of a wrapping-belt, rollers on which it is supported or guided, an oscillating arm carrying one of said rollers, an ejecting-cradle pivotally mounted on said arm, means for turning the cradle about its pivot when the arm oscillates and another cradle which receives the article to be banded and delivers it to the ejecting-cradle.

35. In a machine for applying bands or labels to cigars or other articles, the combination of a wrapping-belt, rollers on which it is supported or guided, an oscillating arm carrying one of said rollers, a rod carried by said oscillating arm, a shield or guard attached to said rod, a spur-wheel on the rod and a slotted frame having a limited movement and provided with a segment of teeth with which said spur-wheel engages.

36. In a machine for applying bands or labels to cigars or other articles, the combination of a wrapping-belt, rollers on which it is supported and guided, an oscillating arm carrying one of said rollers a rod mounted in bearings on said oscillating arm, a shield or guard secured to said rod a spur-wheel on the rod, a slotted frame having a segment of teeth engaging said spur-wheel, stops on the stationary frame of the machine and on the oscillating arm for limiting the movement of the slotted frame, and devices for adjusting the movement of the frame.

37. In a machine for applying bands or labels to cigars or other articles, the combination of a wrapping-belt, means for forming a pocket therein, a shield or guard extending across the mouth of the pocket and having a roller traversed by the belt and means for moving said shield or guard into and out of the pocket.

38. In machine for applying bands or labels to cigars or other articles, the combination of belt-supports, a wrapping-belt traversing them endwise and having a pocket-forming portion between the supports of sufficient length to accommodate the largest article and a slackened portion on the outside of one of the supports, means for applying a slight tension on the slackened portion, means for forming a pocket in the belt larger than the article to be banded, means for moving the belt to first draw it with a gentle pressure around the article and then to rotate the article, and a cradle which, after the article is wrapped, ejects it from the wrapping devices laterally.

In testimony whereof I have hereunto subscribed my name.

WILLIAM CYRUS BRIGGS.

Witnesses:
 THOS. MASLIN,
 A. C. MILLER.